United States Patent [11] 3,617,650

[72] Inventor Herbert Morello
Phoenixville, Pa.
[21] Appl. No. 781,163
[22] Filed Dec. 4, 1968
[45] Patented Nov. 2, 1971
[73] Assignee Digital Information Devices, Inc.
Norristown, Pa.

[54] AUTOMATIC THREADING MECHANISM USING THREE TAPE LOOPS
15 Claims, 16 Drawing Figs.

[52] U.S. Cl. 179/100.2PM, 242/182
[51] Int. Cl. G11b 15/66
[50] Field of Search 179/100.2 PM, 100.2 P, 100.2, 100.2 MT; 340/174.1 E; 274/4 D, 11 D; 242/182–185; 226/89, 91, 97

[56] References Cited

UNITED STATES PATENTS

| | | | |
|---|---|---|---|
| 2,919,076 | 12/1959 | Buslik et al. | 242/185 |
| 3,027,059 | 3/1962 | Streeter | 242/183 |
| 3,208,682 | 9/1965 | Pastor et al. | 179/100.2 |
| 3,254,854 | 6/1966 | Deighton et al. | 226/97 |
| 3,302,900 | 2/1967 | Messamer | 226/97 |
| 2,954,911 | 10/1960 | Baumeister et al. | 179/100.2 PM |
| 3,499,614 | 3/1970 | Badum | 179/100.2 PM |

*Primary Examiner*—Terrell W. Fears
*Assistant Examiner*—Robert S. Tupper
*Attorney*—Howson and Howson

ABSTRACT: Referred apparatus employs a cartridge in the form of a narrow casing containing a supply of magnetic tape on and between a supply reel and takeup reel. The cartridge is inserted from above into a well in a support housing which is hinged along a bottom edge to move out from the console for loading and unloading and back to the console for cooperation with a tape drive. The tape reel supporting structure engage and center on drive hubs, and a vacuum system, including ports through the hubs, holds the reel supporting structure to the drive hubs. Automatic threading is then accomplished. Tape is withdrawn by vacuum through an opening in an edge of the cartridge through a vestibule into the middle one of three loop boxes opening into the vestibule. When in the middle loop box a pickup and recording head is moved across the box within the loop. Thereupon the vacuum is released in the middle box and imposed on each of two outer loop boxes opening into the vestibule each side of the middle box. This latter action pulls the tape around driving capstans in position to operate.

INVENTOR:
HERBERT MORELLO
BY
Howson & Howson
ATTYS.

INVENTOR:
BY HERBERT MORELLO
Howson & Howson
ATTYS.

INVENTOR:
BY HERBERT MORELLO
Howson & Howson
ATTYS.

FIG. 6.
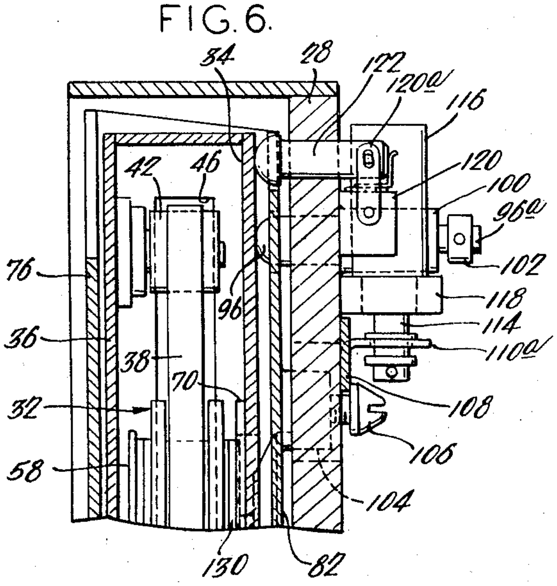
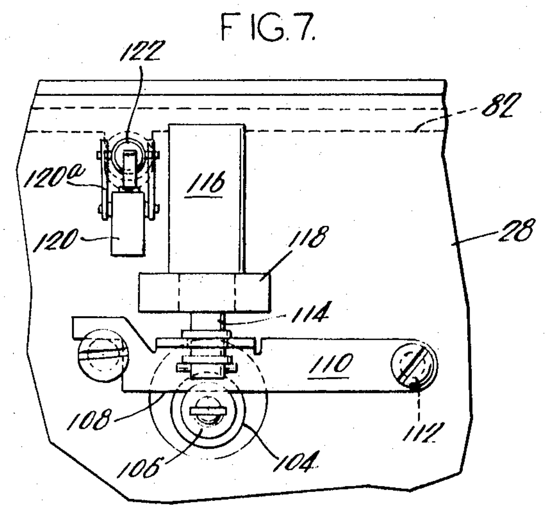
FIG. 5.
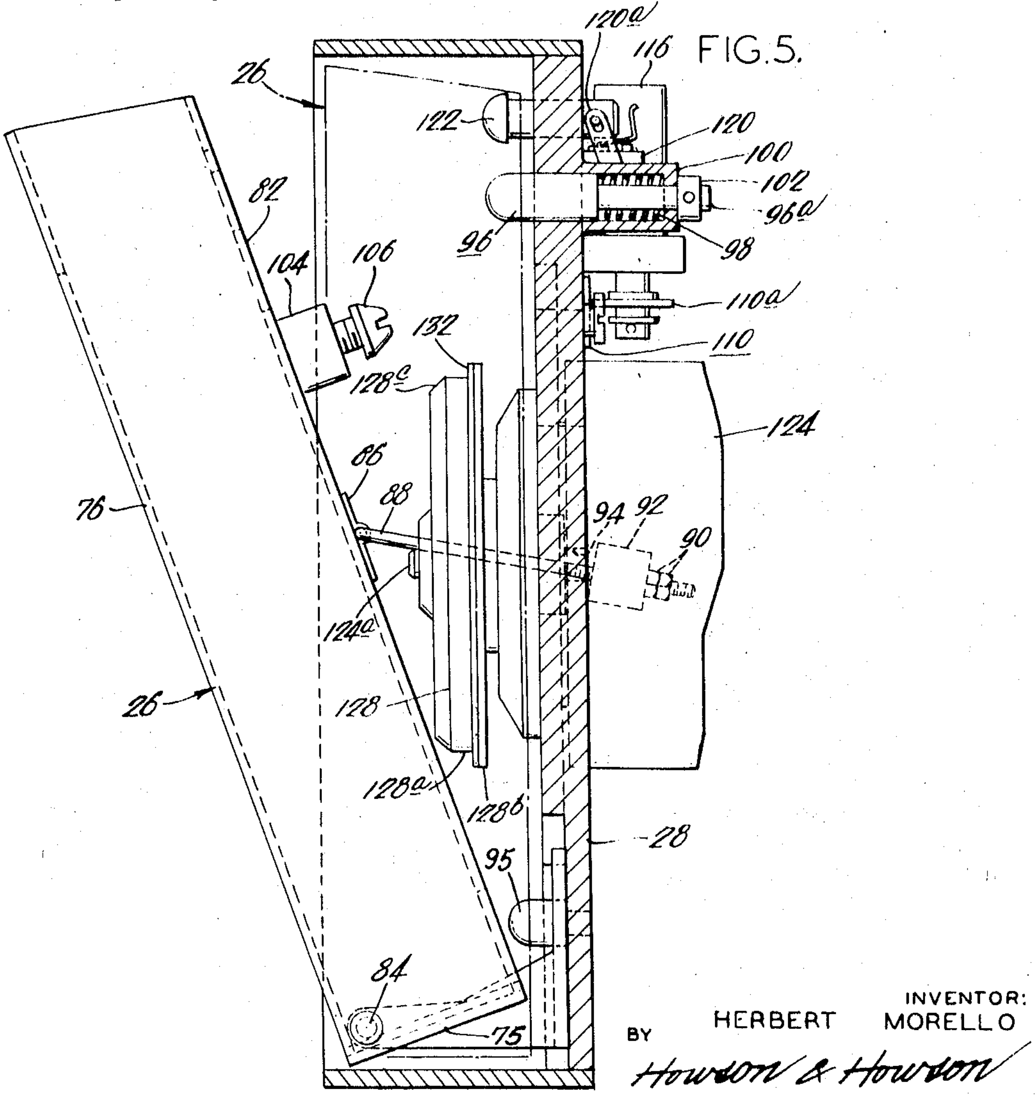
INVENTOR:
HERBERT MORELLO
BY Howson & Howson
ATTYS.

INVENTOR:
BY HERBERT MORELLO

Howson & Howson
ATTYS.

INVENTOR:
HERBERT MORELLO

BY *Howson & Howson*

ATTYS.

INVENTOR:
HERBERT MORELLO
BY *Howson & Howson*
ATTYS.

AUTOMATIC THREADING MECHANISM USING THREE TAPE LOOPS

This invention relates to handling apparatus for magnetic tape such as is used in computers, including means for inserting the tape into the apparatus by an unskilled person, means for automatically threading the tape into the apparatus and means for equally easily removing the tape from the apparatus.

In the prior art the handling of magnetic tape and the placing of that tape into the computer and removing it from the computer has been left to highly skilled technicians or engineers. Careless handling of the tape could and has led to its damage or misalignment in the transport system. Misalignment in the transport system may result in misalignment at a pickup or recording head, and hence inaccurate, and possibly inconsistent, recordings and readings on the tape.

The purpose of the present invention is to provide means for accurately positioning tape reels in a system without the need of careful and accurate manual positioning and securing which has required skill on the part of the person doing the operation. The purpose is also to automatically and accurately thread the tape into the tape transport and head without the intervention of manual threading of any type while at the same time providing accurate alignment of the tape through the tape transport and at any and all pickup and recording heads. In fact, it is the purpose of the present invention to provide a simple system which will enable unskilled clerical personnel to initiate automatic loading and threading of a computer with magnetic tape.

The invention relates to two principal areas of a tape-handling system: first, the magnetic tape loading and unloading area and, second, the threading and transport area. Novel apparatus is provided in each of these areas and in addition a novel process or method of handling tape is provided.

With regard to the loading and unloading process, the procedure is simplified by providing a cartridge within which a loaded supply reel and a takeup reel, to which the end of the tape is connected, are provided. The tape is preferably threaded from the supply reel to the takeup reel around guide pulleys which are positioned along an edge of the cartridge adjacent an opening in the edge from which tape may be withdrawn for threading.

The cartridge is of a standard shape and size and preferably is adapted to be accurately positioned by a reference frame structure which advantageously is a support housing having a cartridge receiving well. In addition to the opening in the edge of the cartridge there is preferably an opening through a sidewall providing access to each of the reels.

The support housing, reference frame structure has a cartridge receiving position and an operating position. Means is provided on the reel spools or other tape reel members to mechanically index the spools by moving them laterally into positions centered on their respective hubs as the housing is moved into operating position. The vacuum holds the tape reel members onto the hubs so that they will rotate with the hubs as the hubs are driven in response to command. Preferably, as the support housing is moved into operating position, the hubs' initial contact with the tape reel members causes a release of the reel members from the friction material on the cartridge sidewalls into which position they are urged by spring means. This friction material prevents reel movement of any kind within the cartridge when the reels are out of operating position. As the cartridge is moved into operating position the spring means is overcome by contact with the hubs.

The configuration of the apparatus is such that the tape drive and head are located in a laterally confined region in the general plane of the tape when the cartridge is in operating position. Excess tape unwound from the supply reel passes through an opening in the edgewall of the cartridge and a corresponding opening in the support housing into an enclosed tape deck area. First, the tape enters a vestibule compartment in which preferably are located a pair of driving capstans, which rotate in opposite direction, a type well known in the prior art. On the side of the vestibule opposite the cartridge are three loop boxes side by side all opening directly into the vestibule and with partitions between them. These loop boxes each have a vacuum system and the vacuum system of the middle loop box is first employed to draw the tape into that loop box. When the tape is in the middle loop box, a recording and pickup head and a pair of guide rollers on a common reference plate are moved laterally into position across the middle loop box within the loop created by the tape. The vacuum on the center loop box is then released and vacuum is applied in each of the two loop boxes at each side of the center loop box. This draws the tape in two separate loops into these conventional loop boxes and at the same time pulls the tape up against the tape guides and head. While being pulled into the outside loop boxes, the tape is also pulled down around the two capstans and when in this position the tape is ready to be used. In use the tape contacting surface of one of the capstans is supplied with vacuum while the other is supplied with air. The vacuum draws the tape down against that capstan and rotation of the capstan causes the tape to be driven. The air supplied to the other capstan provides an air cushion separating the tape from the rotating capstan so that the tape is not driven by that capstan. Driving and braking techniques are conventional as are writing on the tape or reading from the tape.

For a better understanding of the present invention reference is made to the accompanying drawings in which FIG. 1 shows in perspective view a computer console in accordance with the present invention;

FIG. 5 is an enlarged sectional view taken along line 5—5 of FIG. 2;

FIG. 6 is an enlarged partial sectional view taken along line 6—6 of FIG. 2;

FIG. 7 is an enlarged plan view of the back of the structure shown in FIG. 6 in the partial view;

Figures 1, 8, 9, 10:
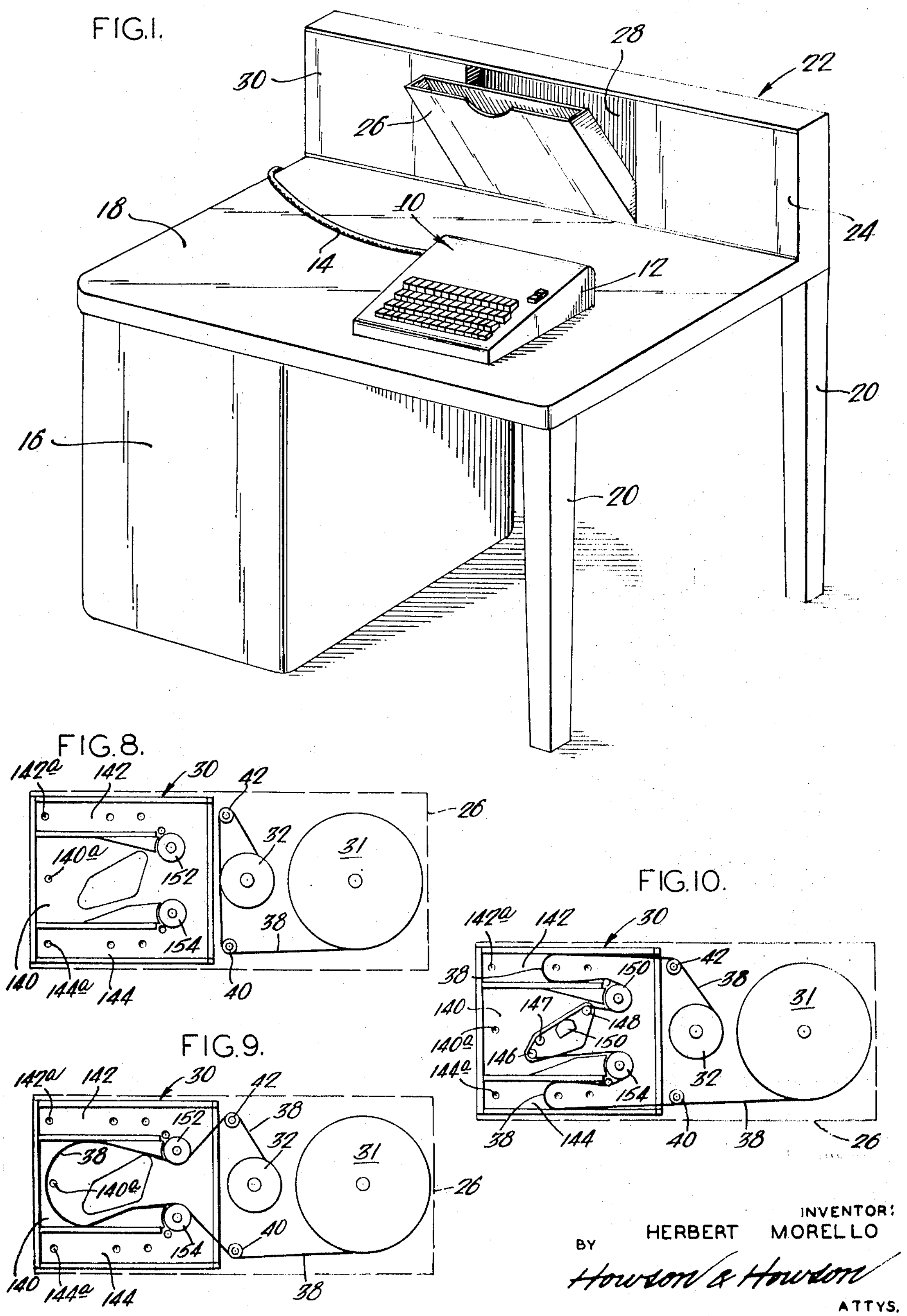
FIGS. 8, 9 and 10 are diagrammatic views corresponding to FIG. 2 but on a smaller scale showing diagrammatically how a tape is threaded automatically into the apparatus of the present invention.

Referring first to FIG. 1, a computer console structure is shown. The purpose of this console is to permit a relatively unskilled typist or stenographer, who is trained in some of the special aspects of this apparatus to use a keyboard, generally designated 10, with alphanumeric keys arranged preferably in the arrangement of an ordinary typewriter keyboard, or otherwise as described. Keyboard electronics generate unique signals such as a binary coded signal, representative of each of the selected keys punched. The electronics is housed within the keyboard housing 12 and connected by a cable 14 into the cabinet 16 for electronics chasses and components.

The console in general has the appearance of a desk, which provides knee room between the electronics cabinet 16 and legs 20. At the rear of the work surface 18 is an upright panel structure 22, having sufficient thickness to house electronics and apparatus, some of which will be described hereafter. The right panel 24 of the structure 22, as viewed by an operator, may be provided with display units and indicators appropriate to the particular application to which the particular console is to be put.

The upright panel structure 22, together with the whole console, also provides a reference frame structure for the magnetic tape receiving and handling apparatus of the present invention. It will be appreciated that, while magnetic tape is considered particularly useful and described in the specific embodiment therein, other types of tapes such as punched paper tape, or even photographic film, may be used in instances where such use is desirable, and appropriate minor changes in the apparatus to enable the use of such modified tapes will be made.

The middle portion of the upright panel structure 22 is provided with support means for a tape reel means containing cartridge. This support means is a support housing 26 providing a well for receiving and position indexing the tape containing cartridge. The support housing is supported on the frame for movement along a predetermined path. In this embodiment, as shown, the support housing is pivotally supported to swing forward into the position shown in FIGS. 1 and 5 to receive a cartridge of tape. After receiving the cartridge the support housing swings back flush into the upright panel 22, its operational position, wherein the tape reel means in the cartridge operates with the tape drive.

In accordance with the present invention, the cartridge, which will be described in greater detail hereafter, is dropped into the open upper end of the well in the support housing 26 and falls by gravity guided by the support housing into proper position for cooperation with the tape drive. The tape drive structure is behind the support housing 26 and a recessed panel 28, except for the hubs which extend beyond the panel 28. When the cartridge is in position to cooperate with the drive means, it is ready to be threaded into the tape transport system. The tape transport system occupies the left panel portion 30, and includes a head for sensing information recorded on the tape and for recording information on it. Automatic threading, which is diagrammatically illustrated in FIGS. 8, 9 and 10 will be described hereafter.

Figure 2:
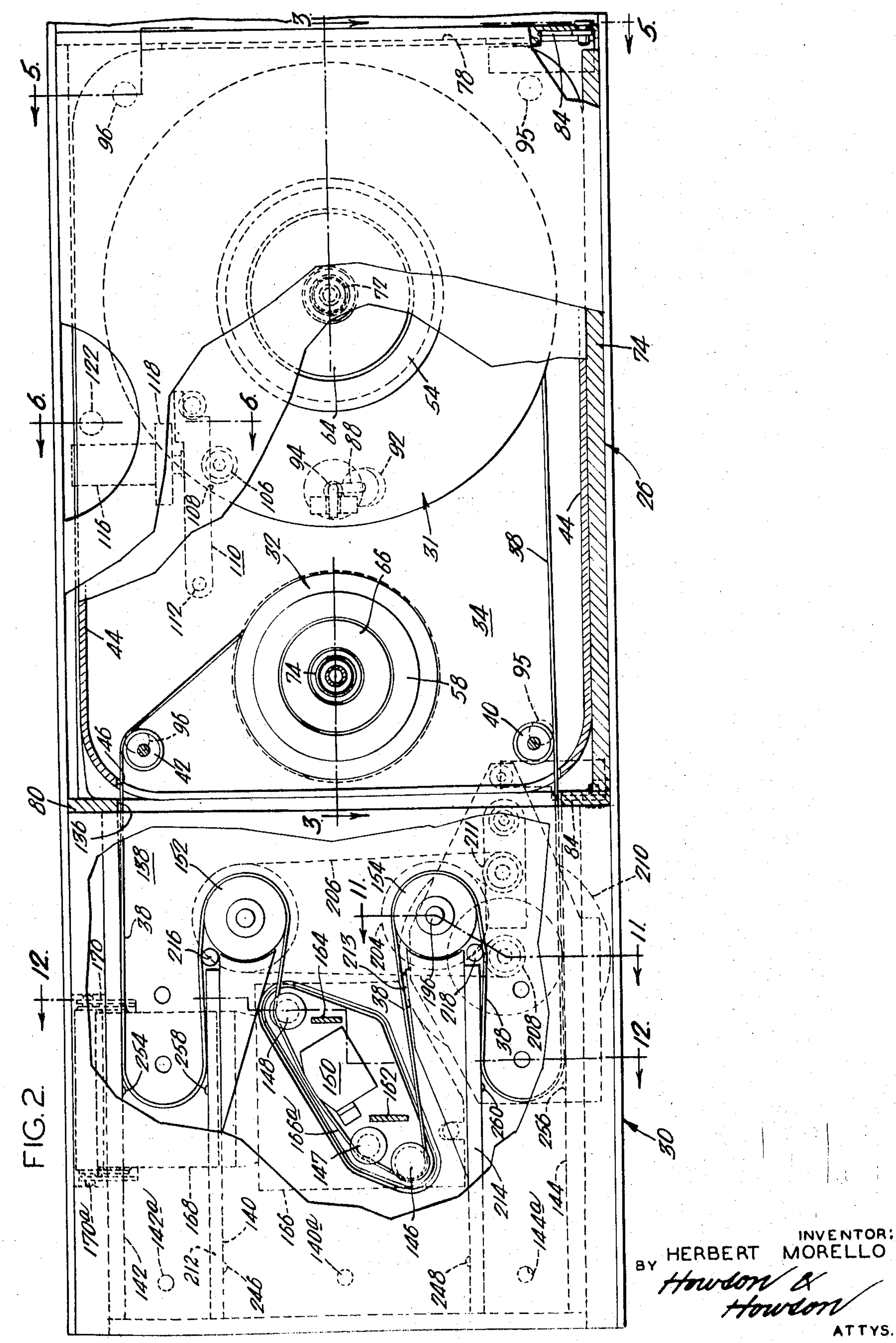
FIG. 2 shows in plan, partially broken away and in section, a view of the left portion of the vertical back panel of the computer console of FIG. 1 on an enlarged scale.

Reference is now made to FIG. 2, which shows a tape cartridge in place and cooperating with the drive hubs, and the tape threaded in the tape transport and ready for operation. The areas seen in FIG. 2 are the left and center portions of panel 22, the support housing 26 and the transport area 30, with some structure shown broken away and in partial section.

THE CARTRIDGE

Figures 3, 4:
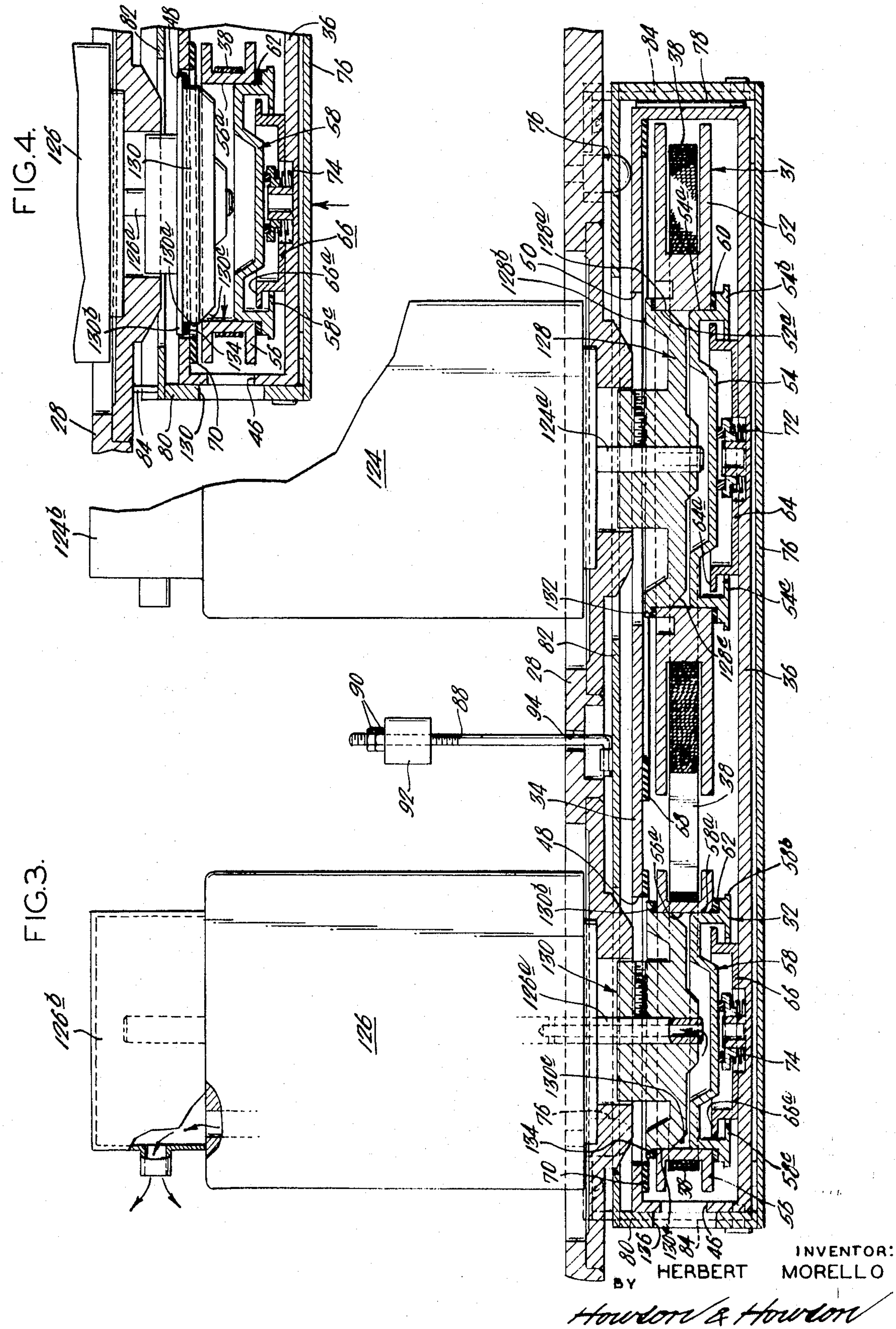
FIG. 3 is an enlarged sectional view taken along line 3—3 of FIG. 2.
FIG. 4 is a partial sectional view similar to part of FIG. 3 showing the driving hub for the takeup reel as the cartridge is being brought into operating position.

The cartridge in concept is a ready to use tape supply inside a casing, preferably closed in periods of nonuse to keep dust and dirt out, including a pair of tape reel members. There is a supply reel, generally designated 31, and a takeup reel, generally designated 32. As seen in FIG. 3, these reels have parallel axes, generally perpendicular to the sidewalls 34 and 36 of the cartridge. FIG. 8 shows the configuration of the magnetic tape 38, extending between supply reel 31 and takeup reel 32, before threading of the tape transport. Instead of connecting the tape directly from the supply reel 31 to takeup reel 32, it is diverted into the path shown in FIG. 8 by guide rollers 40 and 42. Guide rollers 40 and 42 are idlers mounted on one sidewall of the cartridge casing and extending across the casing between the sidewalls. In this particular embodiment the cartridge is generally rectangular in form, although in other applications it may be of other shape and/or may differ in size. In order to keep the cartridge generally dustproof, the sidewalls 34 and 36 are interconnected by edgewalls 44 around most of the periphery of most of the cartridge. An opening 46 is provided in the edge walls 44 of the cartridge through which the tape is withdrawn, as seen in FIG. 2. The location of this opening determines the positions of idler rollers 40 and 42, which are preferably positioned such that the extent of the tape path between them lies closely adjacent to the opening and conveniently available to be fed through the opening when needed. This opening must be sufficiently long not to interfere with the tape at any time as it is being fed to, threaded upon, or used by the tape transport. The opening is preferably provided with means to keep it closed when the cartridge is not in use, which need not be considered here.

Openings 48 and 50 are also provided through the sidewall 34, which, as can be seen in FIG. 3, permit entry into the cartridge of the driving hubs for the takeup and supply reels, respectively. Openings 48 and 50 are round and preferably smaller than some portions of the tape reel means contained in the cartridge.

As seen in FIGS. 3 and 4, the tape reel means for the supply reel consists in this case of a reel structure 52 as well as enclosure and alignment means 54. Similarly, the tape reel means for the takeup reel consists of the reel means 56 and the enclosure and alignment means 58. The nature of the tape reel means may vary widely depending upon need in a particular embodiment. Where the cartridge is to be used with a vacuum hub system, as is true here, however, some enclosure means, functionally on the order of members 54 and 58, is required. If the cartridge were not used, the enclosure means might be integral with the reels. In this particular embodiment, however, the enclosure means 54 and 58 also are the reel-mounting devices for the cartridge and, for this purpose, they are provided with cylindrical surfaces 54*a* and 58*a*, which are snugly accommodated with the respective precision cylindrical surface 52*a* and 56*a*, of reel 52 and 56. The enclosure members are also each provided with a circumferential flange 54*b*, 58*b*, which acts as a stop to limit the axial movement of the reel as it is put in place. A sealing and antislip element 60, 62 in the form of a flat annular gasket, is placed between the reel 52, 56 and the stop flange 54*b*, 58*b*. In addition to the outwardly extending flange 54*b*, 58*b*, there is an inwardly extending flange 54*c*, 58*c*, which forms an annular inwardly directed circumferential channel and acts to trap a flange 64*a*, 66*a* on position limiting member 64, 66 fixed to sidewall 36. Each of the flanges 64*a*, 66*a* has a smaller diameter than the respective internal outer diameter of each channel of the closures 54, 58 so that the reels have limited movement laterally relative to the cartridge. In addition the flange 64*a*, 66*a* is trapped so as to limit reel movement axially also. The trapped flange 64*a*, 66*a* therefore generally retains the tape reel means position but still allows for some sufficient adjustment laterally and axially to permit automatic mounting as described hereafter.

When the cartridges are handled before being placed in operation, it is desirable that the reels not be free to move around and therefore, means is provided to hold the reels in place. This condition cannot be in the drawing, but is best pictured from FIGS. 3 and 4. Annular pads 68 and 70 of friction material fixed to the sidewall 34 of the cartridge surround the opening 48 and 50, respectively. Springs 72 and 74 urge each of the closure members 54 and 58 away from cartridge sidewall 36. In so doing, through the intermediate structure previously described, urge the reel 52 into the pad 68 and reel 56 into pad 70 when no hubs are present to urge the reels away. The springs 72 and 74 thus act to hold their respective reels in an arbitrary fixed position while the cartridge is not in use. The pads 68 and 70 incidentally serve as dust seals and the reel closure combinations 52–54 and 56–58 act to close openings 48 and 50 through which dust might otherwise enter the housing to contaminate the tape 38.

Since it is the purpose of the cartridges to permit handling by relatively unskilled personnel, the cartridges are not to be opened except by skilled processors. When opened however, the reels 52 and 56 may be easily removed from closure mounting members 54 and 58 and replaced. The axial lengths of the cylindrical mounting surfaces 54*a* and 58*a* above the shoulders 54*c* and 58*c* are such that there is no possibility of the reels moving sufficiently in the axial direction within the closed cartridge to come off their mountings. In fact, the dimensions are designed so that the action of the springs 72 and 74 moving the reels 52 and 56 away from the position limiting members 64 and 66 not only will permit no escape from the mounting surface but will hold the reels against rattling which might otherwise cause them to come loose.

The Support Housing for the Cartridge and Rotatable Drive Hubs for the Tape Reels Referring particularly to FIG. 5, the support housing providing a support well for receiving and position indexing a tape reel means containing cartridge is seen. The support housing in this case is a narrow hollow box, shoe, or well, arranged generally vertical with its access opening at the top. The opening in the top permits edgewise and lengthwise insertion of the cartridge with the openings 48 and 50 facing the back. The cartridge is dropped into the opening and falls to the bottom 75 which acts as a position indexing reference. In moving downward it is guided by the front wall 76 and laterally held in position by endwalls 78 and 80. Backwall 82 also acts as a guide to prevent any misalignment. The housing 26 as a whole serves as a guide to assure accurate positioning in the cartridge within predetermined limits. The support housing 26 is attached to the reference frame panel 28 by means of hinges 84, which provide a horizontal pivot near the bottom forward edge of the support housing 26. Wall 82 has attached to its back a pivot bracket 86 to which a short crossbar of L-shaped slide rod 88 is rotatably affixed in horizontal position, parallel to the hinge pivot. The remote end of L-shaped rod 88 is threaded to provide adjustment by means of nut 90 for adjustable resilient stop 92. The slide 88 passes through an opening 94 in reference frame panel 28, which opening is too small to permit passage of stop 92. When stop 92 comes to rest against the back of panel 28, as shown in FIG. 5, the support housing 26 is able to move no further forward about pivot 84. In this position, the cartridge is inserted. The support housing 26 is then pushed back into place about pivot 84 to the position shown in dashed lines in FIG. 5. To achieve the position shown in the dashed lines, the housing 26 and specifically backwall 82 must contact and depress a plurality of similar spring loaded pins 96. Pins 96 are urged forward by springs 98 extending between the back of a cup-shaped housing fixed to panel 28 and a shoulder on the pin 96. A stem 96*a* projects back from the shoulder through an opening in the bottom of cup housing 100. To this stem beyond the cup housing is attached a nut, or washer 102, providing a stop shoulder to limit forward motion of the pin when the cartridge housing 26 is moved out of contact with the pins, as shown in FIG. 5.

A boss 104 projects from backwall 82 of the housing and is accommodated by a hole in the panel 28. This boss has threaded into it a screwlike catch 106, which has a frustoconical head providing a bevelled cam approach and a step shoulder to the screw shank which provides the catch for latch member 108. Latch member 108 is provided by the bottom inset edge of lever 110. Lever 110 has a pivotal connection 112 to the back panel 28 and is free to rotate about pivot 112, but is limited in that rotation by attachment of its flange 110*a* to plunger 114 of solenoid 116. Solenoid 116, in turn, is fixed to the panel 28, by bracket 118. A stop limits the downward movement of the plunger 114 to a point where the latch 108 will be contacted by the bevelled cam portion of the head of catch 106, as it passes through the opening provided for this purpose in panel 28 as the housing 26 is pushed back into place. Further backward movement of catch 106 will tend to divert the latch 108 upwardly along the frustoconical cam surface until the head is passed, at which point the latch 108 falls and catches behind the shoulder. As this action occurs the support housing is being pushed back against the action of the spring-urged pins 96 and when the housing 26 is released the pins 96 will push the housing 26 forward to the point where latch 108 is against the shoulder of catch 106, as shown in FIG. 6. The latch 108 will remain held in this position during operation of the tape apparatus and, when it is desired to release the support housing to remove the cartridge, the solenoid 116 is energized to draw core 114 upward into the solenoid winding, thereby raising core 114, consequently raising lever 110 to which core 114 is attached, and at the same time releasing latch 108 from the shoulder catch 106. When this occurs the spring loaded pins 96 will urge the support housing 26 forwardly and it will move outwardly under the action of gravity to the position shown in FIG. 5.

Also provided and mounted on the back of panel 28 is a safety switch interlock 120, which has a yoke actuator 120*a*, coupled to a pin 122, which projects through a hole in panel 28, as seen best in FIG. 6. This pin is in the center of the structure of the housing 26, and the top of the housing backwall 82 is cut away in this location so that the tip of the pin 122 cannot contact the backwall. The backwall 34 of the cartridge will contact and push pin 122 backward, as seen in FIG. 6, against the spring loading inherent in switch 120, to actuate that switch, if a cartridge is present. The switch cannot be actuated, however, if no cartridge is in the well. With the cartridge present, when the switch 120 is actuated, the hub driving motors 124 and 126 (see FIGS. 3 and 4) will operate. For example, switch 133 may be a series switch in the power lines of these two motors rendering it impossible for them to be energized without switch 120 being closed. In fact, switch 120 is preferably a safety interlock for the whole electrical circuit.

Motors 124 and 126 are preferably standard synchronous motors providing highly accurate speed. These motors are provided with an imperforate housing and hollow tubular shafts 124*a* and 126*a*, which are provided with a T-bore inside of the housing. The motors are mounted by the housings to the deck 28 and the shafts 124*a* and 126*a* are supported relative those housings by conventional bearings. To the back of each of these motor housings is attached an imperforate auxiliary housing 124*b* and 126*b*, respectively, as shown in FIG. 3. Passages are provided in the motor housing end plates to provide vents into attached auxiliary housings 124*b* and 126*b*. The housings themselves each have a tubular nipple for attachment to a hose. The hose in turn is connected to a vacuum cleaner type motor-driven vacuum pump to provide a suction effect, or partial vacuum through the motor housings and the tubular shafts 124*a* and 126*a*. This partial vacuum is used to hold the tape reel means 52–54 and 56–58 to the drive hubs 128 and 130, which are fixed to the motor shafts 124*a* and 126*a* by suitable means. The drive hub in each case has a cylindrical edge which closely fits within the reel surfaces 52*a* and 56*a* respectively and, in the mounting position shown, the circumferential flanges 128*b* and 130 *b* provide stops limiting and fixing the position on the hubs 128 and 130 into which reels 52 and 56 are moved and held by the partial vacuums as shown in FIG. 3. A flat annular sealing gasket 132 and 134 is provided between the flange 128*b* and reel 52 and between flange 130*b* and reel 56, respectively. Thus the walls 52*a* and 56*a* and closure structure 54 and 58, respectively, form cup structures in which the hubs 128 and 130 are snugly received. The vacuum pump draws a vacuum in the space between the reels and the hubs, which causes the reels to be drawn onto the hubs tightly to rotate with the hubs.

It will be apparent that while the reels in the cartridge are in approximately proper position for receiving the hubs, chances are that they are not precisely in proper position. For this reason bevelled surfaces 128*c* and 130*c* are provided on the respective hubs to act as camming means to shift them laterally as required to properly mate with the hubs. As seen in FIG. 4, as the cartridge is moved toward the hub, if a reel is not precisely coaxial with the hub, the bevelled surface (here 130*c*) first contacts the leading edge of cylindrical reel surface (56*a*). As the housing 26 is moved further into position, the hub 130 will be acting against and compressing the spring 72 in the cartridge and the reel 56 will tend to slide laterally under the urging of bevelled surface 130*c* to relieve this spring pressure until the reel 56 is centered on the cylindrical portion 130*a* of hub 130. It will be appreciated by those skilled in the art that a bevelled surface could also or instead be provided on the reel and that rounded instead of frustoconical surfaces could be employed. The spring 72 will continue to urge the reel 56 onto the hub 130 until the hub is seated against material 134 on circumferential flange 130b. The tolerances built into the cartridge and the overall system are such that the trapped flange 66a permits sufficient lateral movement of closure 58 and the reel 56 to accommodate proper alignment and fit of the hub and reel. It will be observed that in the operating position shown in FIG. 3, the springs 72 and 74 remain compressed and urge the reels onto the hubs, but the hubs hold the reels out of contact with the friction sealing material 68, 70.

The Tape Deck

The tape deck is that area seen in FIG. 2 to the left of the support housing 26. Ordinarily a tape deck will include one or more heads for pick-up and recording, suitable for keeping the tape in alignment, drive means in the form of capstans and a pair of loop boxes providing a storage space for tape to permit startups with a minimum of inertia and tension problems. This tape deck has all of these features plus others which permit automatic threading.

In order to minimize possible problems of tape misalignment the system of the present invention preferably confines the tape laterally in a space only a little wider than tape width. This space in this case must be aligned with the tape as it rests on the hubs 128 and 130 which is also aligned with the spring 136 in the support housing sidewall 80 and opening 46 in the appropriate end edgewall of the cartridge. To this end, front and back confining walls 156 and 158, respectively, are provided which as seen in FIG. 12, for example, confine the tape to movement within a small tolerance beyond its width.

When the cartridge is in position and the motors 124 and 126 are permitted to drive, the tape 38 starts from the position shown in diagrammatic drawing, FIG. 8. In this situation, the motor 124 is energized in order to drive an additional supply of tape out into the tape deck region. In doing so, the tape passes through the opening 46 in the cartridge and opening 136 in the support housing. The tape, upon entering the tape deck area first passes through a common vestibule area 138 which is immediately adjacent the access opening. Across the vestibule from the opening is a middle tape loop box 140 and side tape loop boxes 142 and 144, all side by side with openings side by side into the vestibule. The tape is drawn by vacuum into the middle loop box 140 as seen in FIG. 9 from the tape deck of which the head is withdrawn into a position shown in FIG. 13. Once the tape loop is in place in loop box 140 the head is replaced to the position of FIG. 12, the partial vacuum is removed from the middle loop box 140 and vacuums are drawn in outside loop boxes 142 and 144 to draw the tape 38 into these loop boxes. Upon being drawn into these outside loop boxes, the tape tends to be pulled from the middle loop box 140 in the course of which the tape is pulled up into contact with pickup and recording head 150 and its guide means 146, 147 and 148 in the middle loop box. In the course of pulling the tape into the head, the tape 38 is pulled down around the oppositely rotating capstans 152 and 154 and assumes the position seen in FIG. 10.

A vacuum system is provided by connecting suitable tubing from a vacuum source to the tape loop boxes 140, 142 and 144, respectively through simple ports 140a, 142a, and 144a. The same source of vacuum may be used here as is used for the vacuum at hubs 128 and 130 with suitable valves or diverters to provide vacuum in the selected chambers when desired.

Figures 12, 13:
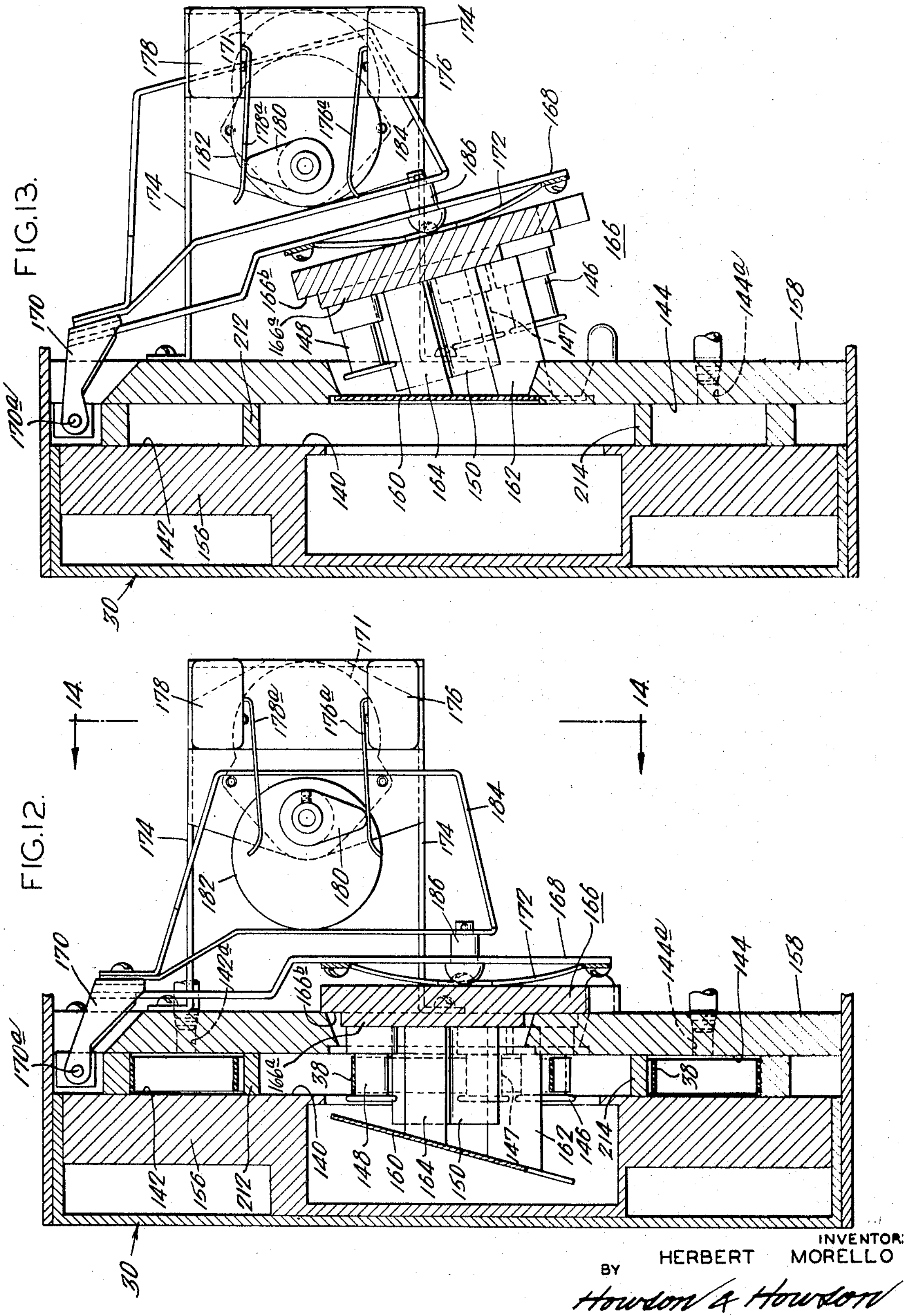
FIG. 12 is an enlarged sectional view taken along the line 12—12 of FIG. 2.
FIG. 13 is a view similar to FIG. 12 but showing the head and guide assembly withdrawn from its operating position.
Figure 14:
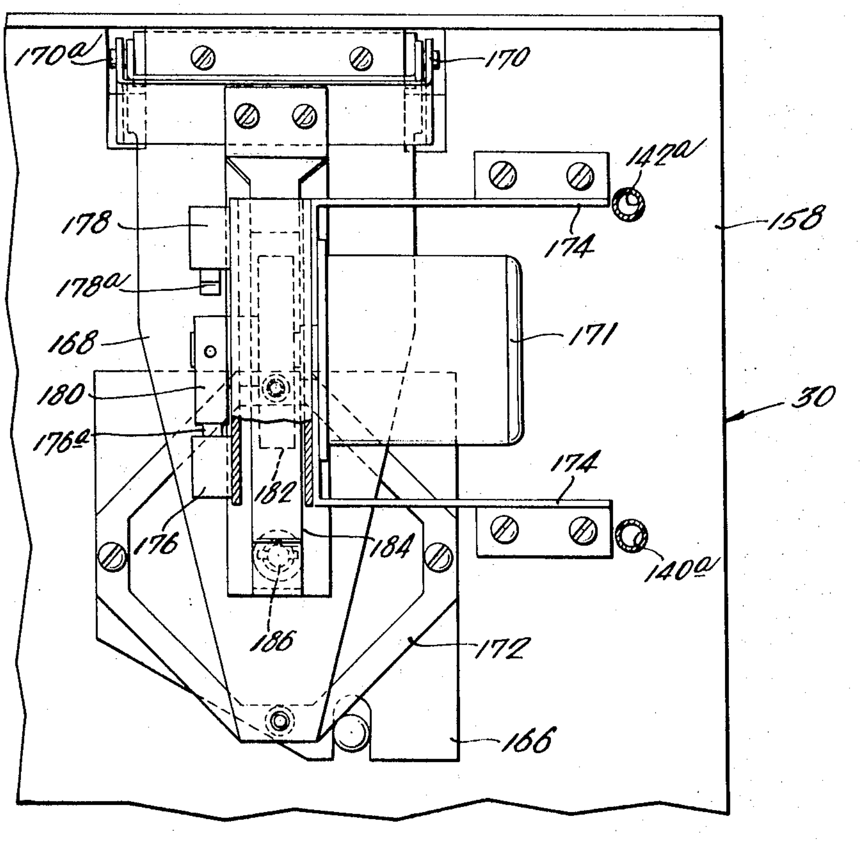
FIG. 14 is a plan view from behind showing the structure of FIG. 12 in position.

FIGS. 12, 13 and 14 show the head assembly which here includes guide rollers 146, 147 and 148 and a pickup and recording head 150. If desired separate pickup and recording heads may be substituted in the assembly. FIG. 12 shows the operative position of the assembly and FIG. 13 shows its retracted position. It will be noted that in retracted position, shown in FIG. 13, a sealing plate 160 is brought into sealing engagement with bounding wall 158 to close the access opening in that wall through which the head is introduced and retracted. The sealing plate is recessed in wall 158 to give an essentially flush closure. The sealing plate 160 in this position helps preserve the vacuum condition in chamber 1 during the period when tape is being drawn into the middle loop box. The sealing plate 160 is supported on a pair of columns 162 and 164 from reference plate 166, as may be seen in FIGS. 2, 12 and 13. Reference plate 166 is the support for the head assembly. The guide rollers 146, 147 and 148 and head 150 are of standard types and serve in conventional manner. However, it is quite unorthodox to mount this precision structure, or any part of it, on a member which moves relative to the tape deck. Such mounting is successful here because all of the guide structure is accurately positioned relative other guide and head structure on the heavy reference plate 166 which will not flex and is indexed precisely into the tape deck reference area against the back of wall 158. Reference plate 166 is machined to index very precisely against the back of wall 158 to give accurate lateral location relative to the tape path to the guide rollers 146, 147 and 148 as well as to pickup and recording head 150. Consequently, when the tape is pulled around the head and these guide rollers there is no danger of misalignment because each of the guide rollers 146, 147 and 148 has the same reference frame as head 150. The requirement is that the head and guides be precisely laterally positioned in the tape deck region and perpendicular or at some other fixed relationship to the wall 158. The position of the head and assembly, i.e., the head guides with rollers in the chamber 140 is not critical as long as it lies within the loop drawn into that chamber. Since the rollers and head are accurately laterally indexed with respect to the rest of the tape deck by the contact of surface 116b of reference plate 166 against wall 158 and no other interfitting or precision parts are required, a high degree of repeatability in the accuracy can be achieved. It will be observed in FIG. 2 that the access opening in wall 158 through which the head and guide structure moves is of odd geometrical shape. A portion 166a of the reference plate extends into this opening and is machined to conform to its shape. The top of this raised plateau 166a provides a surface precisely parallel to the indexing surface 166b. In order to accomplish the withdrawal movement of the head assembly, a movable support bracket 168 in the form of a pivoted lever is provided. One end of the bracket 168 is hinged at one end of the tape deck onto the console reference structure by massive hinge 170 pivoting about pin 170a to bring the reference plate 166 indexing surface 166b into the back indexing surface of wall 158. In order to urge reference plate 166 against wall 158 to assure that plate 166 will seat itself accurately, a ring spring 172, here in the form of a square, is employed. This spring 172 has diagonal corners fixed to lever 168 and intermediate corners fixed to to plate 166. The supporting bracket 168 is moved about it pivotally to move plate 166 into operating position or retract it by motor 171. This same movement of course moves closure 160 into its sealing position when the plate 166 is retracted.

Motor 171 is mounted to the wall 158 by suitable bracket support structure 174 which also supports microswitches 176 and 178. The motor shaft carries a pair of cam elements. Smaller cam 180 operates to contact and actuate actuator arms 176 a or 178a of the micro switches on alternate 180° positions of the cam. Larger circular cam 182 is eccentrically mounted to operate in a cam cage structure 184. Cam cage structure 184 is rigidly attached to the mounting bracket 168 by direct connection at the hinge 170 and also through suitable rigid post connection means 186 at its opposite end. The cam cage provides a track consisting of parallel operating sides generally parallel to support bracket 168. Cam 182 rides continuously within the track of cam cage 184 contacting both of the parallel sides of the cam cage at all times and moving effectively along the length of the cage. Eccentric mounting of the cam 182 causes it to move from the position shown in FIG. 12 to the position shown in FIG. 13 in 180° of rotation. The change in the location of the center of the cam in this period accounts for the principal movement of reference plate 166. In this same 180° of rotation one of the microswitches 176 and 178 is released and the other actuated by the cam 180. These microswitches may be used selectively to stop rotation of the motor by being connected selectively in series with the motor by a suitable pole-reversing switch, as will be discussed hereafter. It will be observed that the square frame spring 172 functions at both extremes of the head mounting structure as seen in FIGS. 12 and 13 to urge reference plate 166 and sealing plate 160, respectively, into operative engagement. In FIG. 12 after the plate 166 has been stopped, cam 182 drives the bracket 168 further toward wall 158, thereby compressing spring 172 and providing a resilient positive spring force which urges plate 166 to seat itself squarely against wall 158. In the position of FIG. 13 bracket 168 has pulled plate 160 into sealing position against wall 158 and as it moves on spring 172 provides tension to urge the sealing plate 160 into position.

Figure 11:
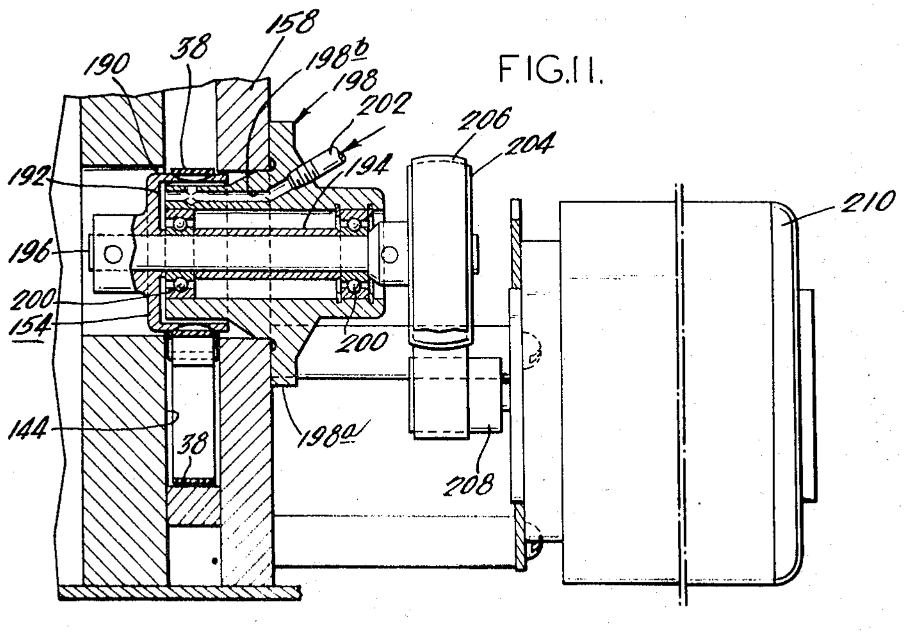
FIG. 11 is an enlarged sectional view along line 11—11 of FIG. 2.

When the head is returned to the position of FIG. 12 after the tape loop is in the position of FIG. 9, the vacuum is discontinued in chamber 140 and vacuum is drawn in chambers 142 and 144, as previously mentioned. This causes the tape to be drawn into these chambers as shown in FIGS. 10 and 2. In this position the tape is drawn around the capstans 152 and 154. These capstans may be in either continuous movement or selectively placed in movement when transport is desired. However, only one of the capstans drives at a given time and this capstan is provided with vacuum or suction through radial ports through the head. FIG. 11, for example, shows how the head 154 is provided alternatively with vacuum or pressure. The working capstan surface is provided by the outer wall 190 of a circumferential channel having an axially directed opening, an annular channel bottom 192 and a tubular sleeve 194 providing an extended inner wall. The tubular portion 194 is, in turn, fixed to shaft 196. The shaft and tubular portion 194 lie within the fixed tubular support structure 198 which is affixed to the wall 158 by a radially outwardly extending circumferential flange **198*a*. To minimize friction and make the structure easily rotatable, ball bearings 200 are provided between tubular portion 194 and tubular support structure 198 at spaced locations. The fixed tubular member 198 terminates inside the rotating channel 190, 192, 194 near its bottom 192 and is provided with duct 198*b* terminating near channel bottom 192 and connected at its other end to a tube 202. Tube 202, in turn, is connected alternately to sources of air pressure or vacuum. The end of outer wall 190 opposite the bottom is close to or in sliding contact with support structure 198 so that the leakage path provided at that point is minimized. The outer wall 190 is perforated in order to supply air or vacuum from the duct 198 directly to the surface of tape 38 to cause it to be repelled from or drawn down onto the capstan surface provided by outer wall 190**.

Rotation is imparted to the shaft 196 and thence to the capstan 190 by pulley 204 around which is wrapped a belt 206. Belt 206 is driven by its engagement on a pulley 208 on motor 210. It also engages a pulley for capstan 152 corresponding to the structure of capstan 154. The belt 206 is arranged in such a way as to drive capstan 152 in the opposite direction from capstan 154. For this purpose an idler pulley 211 and the pulley 208 of motor 210 are used to change belt direction to make this reverse drive possible (see the showing in phantom in FIG. 2).

A vacuum brake 213 is also provided to stop tape quickly and precisely. As will appear hereafter, the brake is a perforated surface, similar to those of the capstan but fixed in position against any kind of movement, to which a vacuum is applied. In this system if either capstan is driving the brake remains off.

As seen in FIG. 2 in order to prevent the tape from being torn or damaged by the edges of walls 212 and 214 between the middle tape loop box 140 and the outer loop boxes 142 and 144, respectively, small diverter rollers 216 and 218 are employed. In addition, since the capstans 152 and 154 are advantageously made larger than wall thickness by a considerable amount, the thickness of each of the walls 212 and 214 is tapered in such a way as to provide a smooth transition from wall to capstan in the middle chamber 140.

Various sensing means may be used to detect various conditions of the tape in the threading process or during use. For example, optical means for sensing tags on opposite sides of the tape may be provided along the tape path to indicate when the tape is approaching its opposite ends.

Photocells may also be used in the tape chambers to detect the presence of the tape within the various tape loop boxes and even to detect the levels of the tape within the boxes in order to indicate the need for additional tape or for takeup of a surplus. Use of a photocell detector 248 together with light source 246 in the middle loop box to detect the presence of tape is shown in FIG. 2 and will be discussed in connection with its functional operation hereafter.

Operation

Figure 15:
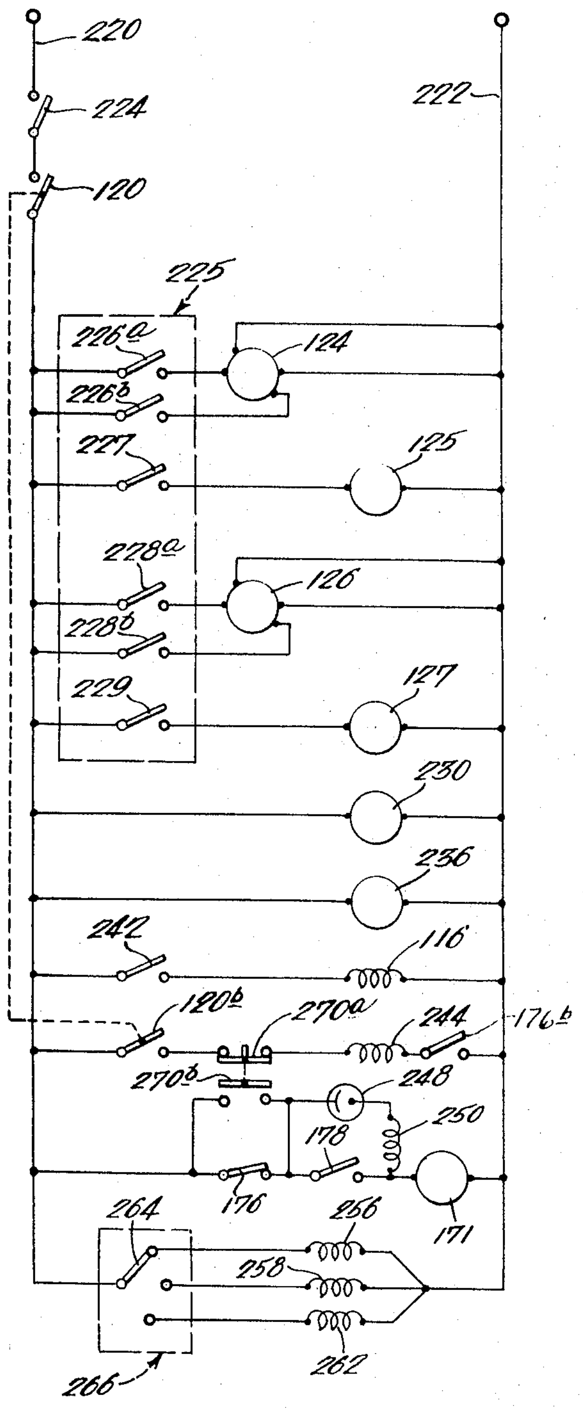
FIG. 15 is a circuit diagram schematically showing electric control elements for the apparatus shown and described.
Figure 16:
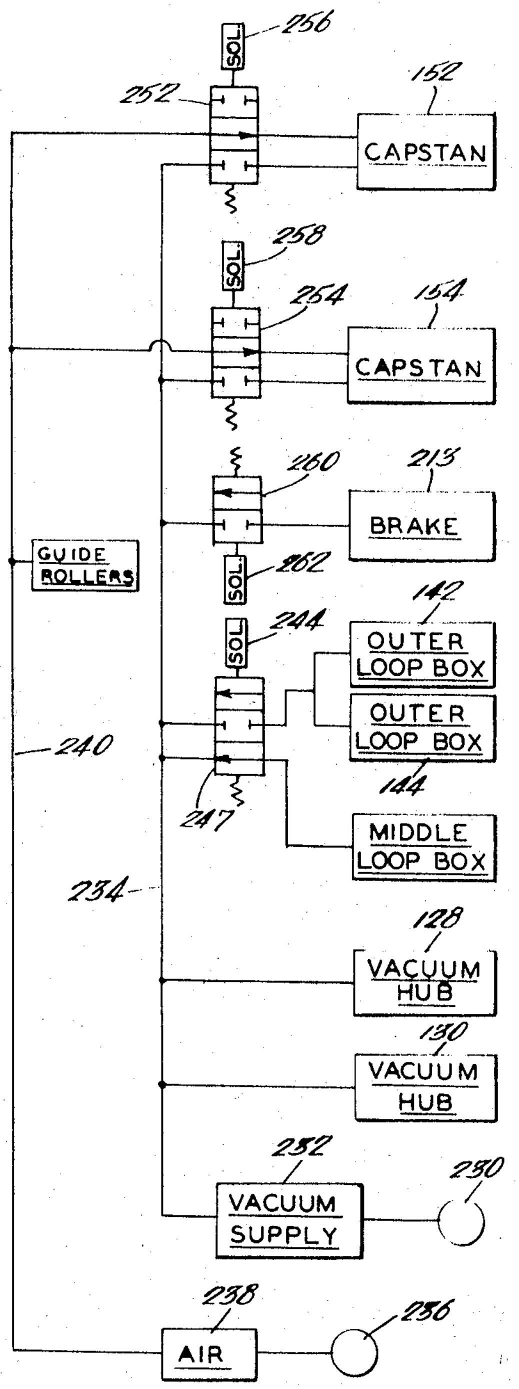
FIG. 16 is a diagram schematically showing vacuum and air pressure elements and connections to control element for the apparatus shown and described.

In order to better explain the threading operation, FIGS. 15 and 16 are provided to show some interrelationships of various devices already described and in some cases to show devices implicitly included, but not necessarily shown elsewhere in the drawings. FIGS. 15 and 16 are referred to interchangeably in order that their relationship may be better appreciated since the pneumatic and vacuum systems of FIG. 16 are inevitably controlled by electrical elements of the circuit of FIG. 15.

Each of the electrical components is connected across power lines 220 and 222. A master switch 224 is available for turning on and off all power and the interlock control switch 120 will allow the various components to be activated only if a cartridge is in the well of the support housing 26 as it is closed into operative position. When switches 224 and 120 are closed the power is available to the components of the circuit.

Each of the motors 124 and 126, which drive the hubs on which the supply reel and takeup reels, respectively are mounted, is provided with a pair of switches. These switches are operated in the course of operation of the computer by logic controlled actuator means generally designated by the dashed box 225. Switches **226*a* and 226*b* control the forward and reverse rotation of supply reel motor 124 and switches 228*a* and 228*b* control similar rotational movement of the takeup reel. Thus the motors can be driven in either direction on demand to supply tape or to take up slack, as required. There is also provided a brake 125 and 127 for each of the motors 124 and 126 respectively, having series control switches 227 and 229. These switches are controlled by the logic 225 such that when motor 124 is running forward or backward its brake 125 cannot be applied but is applied as soon as it stops. The same sort of thing is true of brake 127 relative to motor 126. Motor 230 continuously drives a vacuum pump 232, as shown in FIG. 16, to provide a vacuum supply to line 234. Similarly, motor 236 continuously drives a compressor 238 to supply air pressure to line 240**.

The latch control solenoid 116, which releases the cartridge from its latched operated position is energized upon demand by closing a switch 242. This may be done manually or through an automatically programmed sequence.

When interlock 120 is closed, it affects the logic such that logic control circuit 225 causes one of the motors 124 or 126 to drive and supply tape into vestibule. Simultaneously, switch **120*b* causes solenoid 244 to move valve 246 (see FIG. 16) into position where vacuum is supplied to the middle loop box 140, causing the tape loop to be drawn into that loop box. The tape is drawn into loop box 140 until the light beam from light 247 shining across loop box 140 to photocell 248 is interrupted, rendering that photocell conductive. Thereupon a circuit is completed through switch 176 to motor 171. The photocell 248 is in series with a relay winding 250 which controls the logic 225 for control of motor switches. The logic is acted upon by the signal through winding 250 which stops motor 124 or 126 and the tape feed. As the motor starts to run the cam 180 releases series microswitch 178 so that it closes. The motor 171 continues to run restoring the head 150 to its proper position in the middle loop box. As the rigid plate 166 is spring urged into properly indexed position, the cam 180** opens switch 176, interrupting the motor circuit and stopping motor 171 in the position of FIG. 12 with the head in place. Switch 176 has another pole 176*b* in series with solenoid 244, which interrupts current flow to that solenoid and allows its spring to urge valve 247 into its normal position in which vacuum is cut off from the middle loop box 140 but supplied to both of the outer loop boxes 142 and 144, and discontinues the vacuum in the middle loop box 140. The vacuum in loop boxes 142 and 144 pulls the tape loop from center box 140 into outside loop boxes 142 and 144. In doing so it pulls the tape loop in the center box up into guide rollers 146, 147 and 148 and head 150 and down over capstans 152 and 154.

Operation in the course of normal use of the computer involves driving the tape in the forward direction by capstan 152 and in the reverse direction by capstan 154 or braking by vacuum brake means 213. Each of these means is under the control of a valve. In the case of capstans 152 and 154, valves 252 and 254, respectively, offer an alternative of air in normal position or vacuum when their respective solenoids 256 and 258 are engaged. Valve 260 normally cuts off vacuum to brake means 213 but energization of solenoid 262 permits vacuum to be supplied to the brake means. Each valve 256, 258 and 260 is spring urged into its normal position and the solenoids act against this spring action to reposition the valves. As seen in circuit diagram FIG. 15 these solenoids respond to a logic controlled switch 264 which permits energization of only one solenoid at a time. When driving in a particular direction or stopping is called for the logic of the system through its logic control 266 acts upon switch 264 to position in accordance with the program for tape movement, all of which is beyond the scope of this invention. As mentioned above vacuum can be supplied to only one of the capstans 152 or 154 or the brake 213 at a time. In order to drive, as previously explained, vacuum is supplied to the capstan providing drive in the desired direction which pulls the tape into the rotating hub, at the same time air supplied to the other hub provides an air cushion which keeps the tape away from that capstan. When no drive is desired both capstans are supplied air and vacuum supplied to brake 213 draws the tape to the fixed brake vent and holds it against movement.

In order to supply tape to or take up slack in the loop boxes, supply and takeup reels 128 and 130, driven by motors 124 and 126, respectively, are able to go forward by closing of switches 226*a* or 228*a*, and able to reverse by closing the switches 226*b* and 228*b*. Automatic sensing means may be employed to sense the need for more or less tape in loops and through the logic circuits automatically adjust the switches 226*a*, 226*b*, 228*a* and 228*b* controlling motors 124 and 126, as well as switches 227 and 229 controlling brake motors 125 and 127.

When the tape is to be removed from the tape deck, this is accomplished by pushing pushbutton 270*a*. Normally closed pushbutton contacts 270*a* open to deenergize the solenoid 244 to permit the valve 247 under its spring loading to return to normal position to produce a vacuum in the middle loop box 140. Vacuum in the middle loop box pulls the loop away from the head. Contacts 270*b* simultaneously close the circuit to motor 170 through switch 178, which is closed at that time. Consequently the head structure is withdrawn from the tape deck. Although this is not shown, both contacts 270*a* and 270*b* are preferably self-holding relay contacts which stay in effect until the switch 178 is opened by the cam as the motor reaches the position of FIG. 13 in which the head is fully retracted. The tape can then be retrieved by closing switch 226*b* to run supply reel motor 124 backward until the tape is back into the condition shown in FIG. 8.

Conclusion

In addition to novel structure related to tape handling in the various areas described, there has been described a novel method of loading a tape deck. Many modifications and variations in the structure and methods described above will occur to those skilled in the art, particularly since they are conceptually new. All such modifications and variations within the scope of the appended claims are intended to be within the scope of the present invention.

I claim:

1. An automatic loading mechanism comprising
hubs for tape supply and takeup reels, respectively,
drive means for at least one of said hubs whereby an excess of tape between the two reels may be generated and tape may depart from a defined tape path between the two reels,
an enclosed tape deck area including
a vestibule area adjacent to the two reels and the tape path into which an excess of tape may move,
a pair of outer tape loop boxes having openings into the vestibule area,
a middle tape loop box having an opening into the vestibule area between the openings of said pair of outer tape loop boxes,
tape drive means within said enclosed tape deck area between at least one of said outer tape loop box openings and said middle tape loop box opening to have tape drawn into operative position on the drive means by the vacuum means,
vacuum means having communication with said middle tape loop box,
retractable head means in said middle tape loop box and retractable from said middle tape loop box and retractable from said middle tape loop box whereby the vacuum means may draw a loop of tape past the position of said retractable head means when retracted, and
further vacuum means having communication with each of the pair of outer tape loop boxes for drawing tape loops into each of said pair of boxes, after the retractable head means has been repositioned in the middle tape loop box whereby the tape is drawn into a fixed tape path around said retractable head means and said tape drive means.

2. The automatic loading mechanism of claim 1 in which the drive means includes a pair of capstans, respectively between different ones of the outer tape loop boxes and the middle tape loop box.

3. An automatic loading mechanism comprising
hubs for tape supply and takeup reels, respectively,
drive means for at least one of said hubs whereby an excess of tape between the two reels may be generated and tape may depart from a defined tape path between the two reels,
an enclosed tape deck area including
a vestibule area adjacent the two reels and the tape path into which an excess of tape may move,
three tape loop boxes having openings into the vestibule area,
selectively actuatable vacuum means in communication with each of said tape loop boxes for selectively drawing tape loops into the middle or the outer pair of tape loop boxes,
retractable head means within the middle tape loop box retractable from said box to permit tape to be drawn into said middle tape loop box past the retracted head, said head being replaceable within the tape loop thereafter,
a capstan between the middle and each of the respective outer tape loop boxes and within the vestibule area in position to have tape drawn into an operative position against said head means in the middle tape loop box and said capstans when the tape loops are drawn into said pair of outer boxes, and
means to selectively drive the capstans in opposite directions.

4. An automatic tape drive loading mechanism comprising
hubs for supply and takeup reels respectively,
drive means for at least one of said hubs whereby an excess of tape between the two reels may be generated,
an enclosed tape deck area including
a vestibule area adjacent to the two reels and the tape path into which an excess of tape may move, and a middle and two outer tape vacuum loop boxes having openings into the vestibule side by side, separated from the takeup reels by the vestibule, retractable head means in the middle tape loop box such that the head means may be retracted to permit the tape to enter the middle tape loop box past the retracted head and thereafter the retracted head means replaced within the tape loop, means for drawing tape loops into selected loop boxes, such that tape first drawn into the middle loop box after the retractable head means is retracted may be drawn into the replaced head means in said middle tape box.

5. The automatic loading mechanism of claim 4 which retraction means is provided for the head means in the middle tape loop box moving the head upon actuation of the retraction means alternatively to retract the head from the plane of the tape loop to permit a tape loop to pass and to replace the head in said plane of the tape loop, after the loop is past.

6. The automatic loading mechanism of claim 5 in which the means for drawing tape loops into the middle tape box is port means communicating with said middle tape loop box with vacuum pump producing means selectively actuatable to draw a tape loop into the middle box while the retractable head means is retracted from the middle tape loop box and to release that loop once the retractable head means is repositioned to enable the loop to be drawn back toward the vestibule into the head.

7. The automatic loading mechanism of claim 6 in which the means for drawing tape loops into each of the outside tape loop boxes is port means communicating with said outside tape loop boxes and connected with vacuum producing means selectively actuated to draw tape loops into each of said outside tape loop boxes and thereby draw the tape into the retractable head means after it is repositioned in the middle tape loop box as well as providing storage loops in the outside boxes.

8. The automatic loading mechanism of claim 5 in which sequencing means is provided to control the sequence of operations of the vacuum producing means including port means into the middle loop box, the retraction means to retract and restore the retractable head means from and to the plane of the tape, and vacuum producing means to draw tape loops into each of the outside loop boxes.

9. The automatic loading mechanism of claim 8 in which sensing means is provided to sense when a tape loop has entered the middle tape loop box sufficiently to assure clearance of the head.

10. The automatic loading mechanism of claim 9 in which the sensing means sensing entry of a tape loop into the middle tape loop box actuates the drive means to restore the retracted head.

11. The automatic loading mechanism of claim 9 in which the means drawing tape loops into each of the outside loop boxes is vacuum producing means having ports into each of the outside loop boxes, said means being actuated by sensing means, once the head is in operating position.

12. The automatic loading mechanism of claim 11 in which the sequencing means provides that the vacuum producing means in the middle loop box is discontinued in order to make the vacuum producing means in the outside loop boxes effective to draw the tape in the middle loop box into the tape head and tape loops into the outside boxes.

13. The method of automatically threading a tape deck comprising providing a supply of tape;

drawing a first loop from the tape supply past a position for introduction of a tape head retracted from operating position and out of the plane of the tape, returning the tape head to operating position in the plane of the tape, and drawing two additional loops on each side of the first loop thereby drawing the tape back into contact with the tape head and into contact with drive means to define a fixed tape path around the tape head to the drive means as the tape is drawn into the two additional loops such that force is maintained on the first loop to hold the tape in a fixed path relative to the head.

14. The method of automatically threading a tape deck from a tape supply which tape deck includes a vestibule, a middle tape loop box, a pair of outside tape loop boxes having openings into a vestibule chamber, capstans close to the openings of the loop boxes and respectively between the middle and each of the other loop boxes, and a retractable head structure in the middle loop box, comprising providing a supply of tape from the tape supply to form a loop in the tape deck, drawing a tape loop into the middle loop box while the head is retracted, returning the head to operating position in the plane of the tape, and drawing the loop from the middle into the outside loop boxes and at the same time drawing the tape into a fixed tape path against the head and the capstans and maintaining the pull on the loops in the outside loop boxes during operation to maintain the fixed tape path.

15. The method of claim 14 in which the loop is successively drawn into the middle and outer loop boxes by vacuum sequentially applied first to the middle and then to the outer loop boxes for that purpose.

* * * * *

UNITED STATES PATENT OFFICE
CERTIFICATE OF CORRECTION

Patent No. 3,617,650 Dated November 2, 1971

Inventor(x) Herbert Morello

It is certified that error appears in the above-identified patent and that said Letters Patent are hereby corrected as shown below:

Column 8, line 1, change "1" to --140--;

line 30, change "116(b) to --166(b)--;

line 49, after "fixed" delete "to", first occurrence.

Column 9, line 48, change "198" to --198(b)--.

Signed and sealed this 10th day of October 1972.

(SEAL)
Attest:

EDWARD M.FLETCHER,JR.
Attesting Officer

ROBERT GOTTSCHALK
Commissioner of Patents

)RM PO-1050 (10-69)

USCOMM-DC 60376-P69
☆ U.S. GOVERNMENT PRINTING OFFICE : 1969 O—366-334